(12) United States Patent
Ravuvari et al.

(10) Patent No.: US 11,864,266 B2
(45) Date of Patent: Jan. 2, 2024

(54) METHODS AND SYSTEMS FOR AVOIDING COLLISIONS IN A MULTI-SUBSCRIBER IDENTITY MODULE (MSIM) USER EQUIPMENT

(71) Applicant: QUALCOMM Incorporated, San Diego, CA (US)

(72) Inventors: AnkammaRao Ravuvari, Hyderabad (IN); Syam Pavan Vadapalli, Visakhapatnam (IN); Roop Sagar Inakollu, Nellore (IN); Kalyana Chakravarthy Kotha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/446,584

(22) Filed: Aug. 31, 2021

(65) Prior Publication Data
US 2023/0063203 A1  Mar. 2, 2023

(51) Int. Cl.
| | |
|---|---|
| *H04W 68/02* | (2009.01) |
| *H04W 8/20* | (2009.01) |
| *H04W 68/00* | (2009.01) |
| *H04W 4/06* | (2009.01) |
| *H04W 56/00* | (2009.01) |
| *H04W 24/08* | (2009.01) |

(52) U.S. Cl.
CPC ............... *H04W 8/20* (2013.01); *H04W 4/06* (2013.01); *H04W 24/08* (2013.01); *H04W 56/001* (2013.01); *H04W 68/005* (2013.01)

(58) Field of Classification Search
None
See application file for complete search history.

(56) References Cited

U.S. PATENT DOCUMENTS

| | | | |
|---|---|---|---|
| 2018/0368099 A1* | 12/2018 | Chen | H04W 68/02 |
| 2021/0153162 A1* | 5/2021 | Chen | H04W 72/0453 |

FOREIGN PATENT DOCUMENTS

WO  WO-2021164127 A1 *  8/2021

* cited by examiner

*Primary Examiner* — Gary Lafontant
(74) *Attorney, Agent, or Firm* — Haynes and Boone, LLP/QUALCOMM INCORPORATED

(57) ABSTRACT

Various aspects of the present disclosure generally relate to wireless communication. In some aspects, a user equipment (UE) detects a collision between a duration in time domain configured to receive downlink data for a dedicated data subscription (DDS) subscription of the MSIM UE and a first paging occasion configured to receive a paging message for a non-DDS (n-DDS) subscription of the MSIM UE. The UE may then monitor a second paging occasion different from the first paging occasion for the paging message, the second paging occasion configured to avoid collision with the duration in time domain.

28 Claims, 7 Drawing Sheets

METHODS AND SYSTEMS FOR AVOIDING COLLISIONS IN A MULTI-SUBSCRIBER IDENTITY MODULE (MSIM) USER EQUIPMENT

FIELD OF THE DISCLOSURE

Aspects of the present disclosure generally relate to wireless communication and to techniques and apparatuses for avoiding collision between time domain durations for receiving data and paging occasions for receiving paging messages in a multi-subscriber identity module user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies, including those applicable to other multiple access technologies and the telecommunication standards that employ these technologies.

SUMMARY

The following summarizes some aspects of the present disclosure to provide a basic understanding of the discussed technology. This summary is not an extensive overview of all contemplated features of the disclosure and is intended neither to identify key elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method of wireless communication performed by a user equipment (UE). The method comprises the UE detecting a collision between a duration in time domain configured to receive downlink data for a dedicated data subscription (DDS) subscription of the MSIM UE and a first paging occasion configured to receive a paging message for a non-DDS (n-DDS) subscription of the MSIM UE. The method further comprises the UE monitoring a second paging occasion different from the first paging occasion for the paging message, the second paging occasion configured to avoid collision with the duration in time domain.

Some aspects of the present disclosure disclose a user equipment (UE) comprising a memory and a processor coupled to the memory. The processor may be configured to detect a collision between a duration in time domain configured to receive downlink data for a dedicated data subscription (DDS) subscription of the MSIM UE and a first paging occasion configured to receive a paging message for a non-DDS (n-DDS) subscription of the MSIM UE. Further, the processor may be configured to monitor a second paging occasion different from the first paging occasion for the paging message, the second paging occasion configured to avoid collision with the duration in time domain.

Some aspects of the present disclosure disclose a non-transitory computer-readable medium (CRM) having program code recorded thereon. In some aspects, the program code comprises code for causing a user equipment (UE) to detect a collision between a duration in time domain configured to receive downlink data for a dedicated data subscription (DDS) subscription of the MSIM UE and a first paging occasion configured to receive a paging message for a non-DDS (n-DDS) subscription of the MSIM UE. Further, the program code comprises code for monitoring a second paging occasion different from the first paging occasion for the paging message, the second paging occasion configured to avoid collision with the duration in time domain.

Some aspects of the present disclosure disclose a user equipment (UE), comprising: means for detecting a collision between a duration in time domain configured to receive downlink data for a dedicated data subscription (DDS) subscription of the MSIM UE and a first paging occasion configured to receive a paging message for a non-DDS (n-DDS) subscription of the MSIM UE; and means for monitoring a second paging occasion different from the first paging occasion for the paging message, the second paging occasion configured to avoid collision with the duration in time domain.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
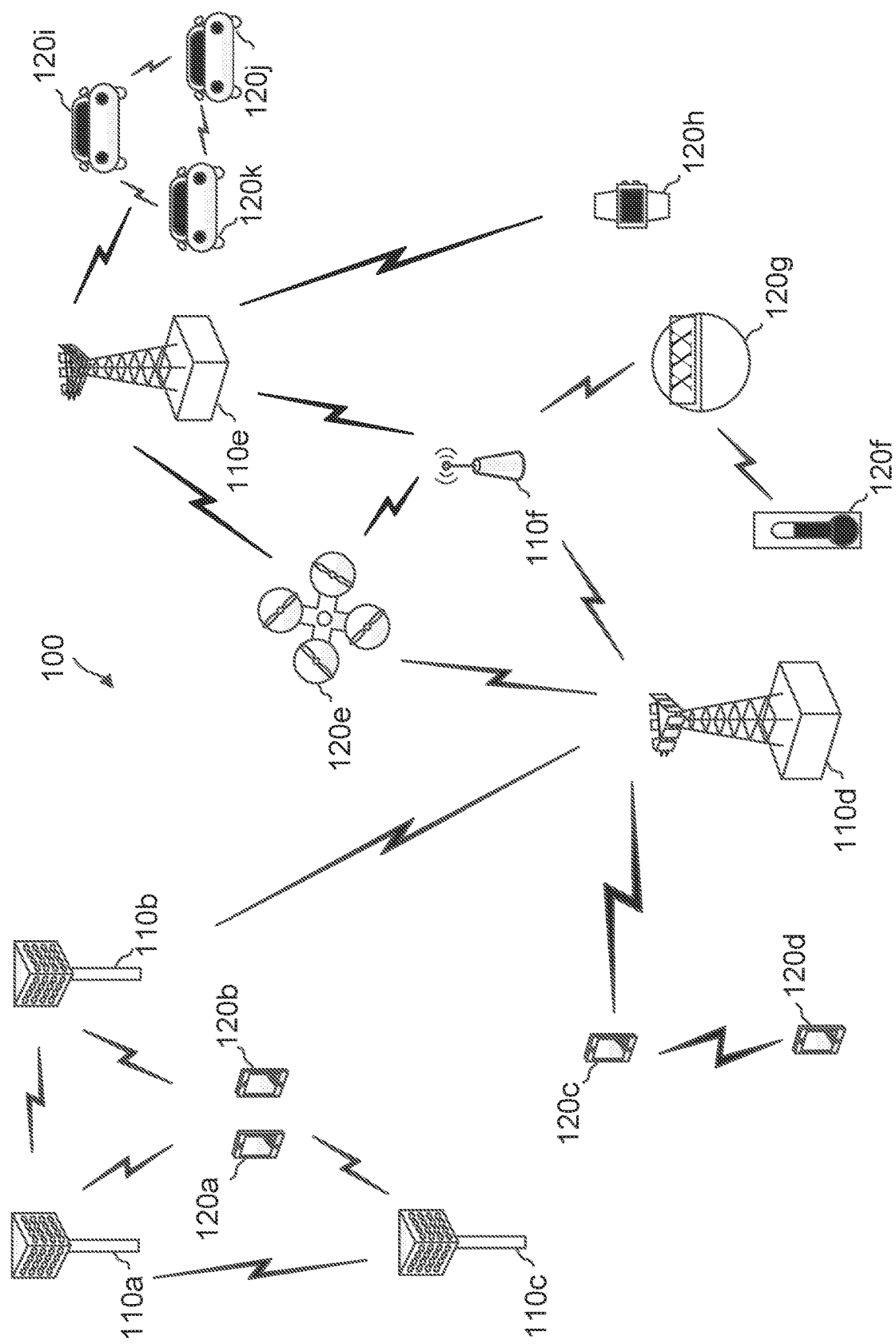
FIG. 1 is a diagram illustrating an example of a wireless communication network, in accordance with various aspects of the present disclosure.

FIG. 1 illustrates a wireless communication network 100 according to some aspects of the present disclosure. The network 100 may be a 5G network. The network 100 includes a number of base stations (BSs) 110 (individually labeled as 110a, 110b, 110c, 110d, 110e, and 110f) and other network entities. A BS 110 may be a station that communicates with UEs 120 and may also be referred to as an evolved node B (eNB), a next generation eNB (gNB), an access point, and the like. Each BS 110 may provide communication coverage for a particular geographic area. In 3GPP, the term "cell" can refer to this particular geographic coverage area of a BS 110 and/or a BS subsystem serving the coverage area, depending on the context in which the term is used.

A BS 110 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110d and 110e may be regular macro BSs, while the BSs 110a-110c may be macro BSs enabled with one of three dimension (3D), full dimension (FD), or massive MIMO. The BSs 110a-110c may take advantage of their higher dimension MIMO capabilities to exploit 3D beamforming in both elevation and azimuth beamforming to increase coverage and capacity. The BS 110*f* may be a small cell BS which may be a home node or portable access point. A BS 110 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless network 100, and each UE 120 may be stationary or mobile. A UE 120 may also be referred to as a terminal, a mobile station, a subscriber unit, a station, or the like. A UE 120 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 120 may be a device that includes a Universal Integrated Circuit Card (UICC). In another aspect, a UE may be a device that does not include a UICC. In some aspects, the UEs 120 that do not include UICCs may also be referred to as IoT devices or internet of everything (IoE) devices. The UEs 120*a*-120*d* are examples of mobile smart phone-type devices accessing network 100. A UE 120 may also be a machine specifically configured for connected communication, including machine type communication (MTC), enhanced MTC (eMTC), narrowband IoT (NB-IoT) and the like. The UEs 120*e*-120*h* are examples of various machines configured for communication that access the network 100. The UEs 120*i*-120*k* are examples of vehicles equipped with wireless communication devices configured for communication that access the network 100. A UE 120 may be able to communicate with any type of the BSs, whether macro BS, small cell, or the like. In FIG. 1, a lightning bolt (e.g., communication links) indicates wireless transmissions between a UE 120 and a serving BS 110, which is a BS designated to serve the UE 120 on the downlink (DL) and/or uplink (UL), desired transmission between BSs 110, backhaul transmissions between BSs, or sidelink transmissions between UEs 120.

In operation, the BSs 110*a*-110*c* may serve the UEs 120*a* and 120*b* using 3D beamforming and coordinated spatial techniques, such as coordinated multipoint (CoMP) or multi-connectivity. The macro BS 110*d* may perform backhaul communications with the BSs 110*a*-110*c*, as well as small cell, the BS 110*f*. The macro BS 110*d* may also transmit multicast services which are subscribed to and received by the UEs 120*c* and 120*d*. Such multicast services may include mobile television or stream video, or may include other services for providing community information, such as weather emergencies or alerts, such as Amber alerts or gray alerts.

The BSs 110 may also communicate with a core network. The core network may provide user authentication, access authorization, tracking, Internet Protocol (IP) connectivity, and other access, routing, or mobility functions. At least some of the BSs 110 (e.g., which may be an example of a gNB or an access node controller (ANC)) may interface with the core network through backhaul links (e.g., NG-C, NG-U, etc.) and may perform radio configuration and scheduling for communication with the UEs 120. In various examples, the BSs 110 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 120*e*, which may be a drone. Redundant communication links with the UE 120*e* may include links from the macro BSs 110*d* and 110*e*, as well as links from the small cell BS 110*f*. Other machine type devices, such as the UE 120*f* (e.g., a thermometer), the UE 120*g* (e.g., smart meter), and UE 120*h* (e.g., wearable device) may communicate through the network 100 either directly with BSs, such as the small cell BS 110*f*, and the macro BS 110*e*, or in multi-step-size configurations by communicating with another user device which relays its information to the network, such as the UE 120*f* communicating temperature measurement information to the smart meter, the UE 120*g*, which is then reported to the network through the small cell BS 110*f*. The network 100 may also provide additional network efficiency through dynamic, low-latency TDD/FDD communications, such as V2V, V2X, C-V2X communications between a UE 120*i*, 120*j*, or 120*k* and other UEs 120, and/or vehicle-to-infrastructure (V2I) communications between a UE 120*i*, 120*j*, or 120*k* and a BS 110.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 110 can assign or schedule transmission resources (e.g., in the form of time-frequency resource blocks (RB)) for downlink (DL) and uplink (UL) transmissions in the network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell specific reference signals (CRSs)

and/or channel state information—reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and/or operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be a NR network deployed over a licensed spectrum. The BSs 110 can transmit synchronization signals (e.g., including a primary synchronization signal (PSS) and a secondary synchronization signal (SSS)) in the network 100 to facilitate synchronization. The BSs 110 can broadcast system information associated with the network 100 (e.g., including a master information block (MIB), remaining system information (RMSI), and other system information (OSI)) to facilitate initial network access. In some instances, the BSs 110 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 120 attempting to access the network 100 may perform an initial cell search by detecting a PSS from a BS 110. The PSS may enable synchronization of period timing and may indicate a physical layer identity value. The UE 120 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive a MIB. The MIB may include system information for initial network access and scheduling information for RMSI and/or OSI. After decoding the MIB, the UE 120 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 120 can perform a random access procedure to establish a connection with the BS 110. In some examples, the random access procedure may be a four-step random access procedure. For example, the UE 120 may transmit a random access preamble and the BS 110 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 120 may transmit a connection request to the BS 110 and the BS 110 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a random access preamble and a connection request in a single transmission and the BS 110 may respond by transmitting a random access response and a connection response in a single transmission.

After establishing a connection, the UE 120 and the BS 110 can enter a normal operation stage, where operational data may be exchanged. For example, the BS 110 may schedule the UE 120 for UL and/or DL communications. The BS 110 may transmit UL and/or DL scheduling grants to the UE 120 via a PDCCH. The scheduling grants may be transmitted in the form of DL control information (DCI). The BS 110 may transmit a DL communication signal (e.g., carrying data) to the UE 120 via a PDSCH according to a DL scheduling grant. The UE 120 may transmit a UL communication signal to the BS 110 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 110 may dynamically assign a UE 120 to operate over a certain BWP (e.g., a certain portion of the system BW). The assigned BWP may be referred to as the active BWP. The UE 120 may monitor the active BWP for signaling information from the BS 110. The BS 110 may schedule the UE 120 for UL or DL communications in the active BWP. In some aspects, a BS 110 may assign a pair of BWPs within the CC to a UE 120 for UL and DL communications. For example, the BWP pair may include one BWP for UL communications and one BWP for DL communications.

In some aspects, the network 100 may be an NR network supporting carrier aggregation (CA) of component carriers (CCs) in which more than one cell can be activated to support DL/UL transmissions. Each cell may correspond to a different CC, and may be within a same frequency band or within different frequency bands.

As indicated above, FIG. 1 is provided as an example. Other examples may differ from what is described with regard to FIG. 1.

Figure 2:
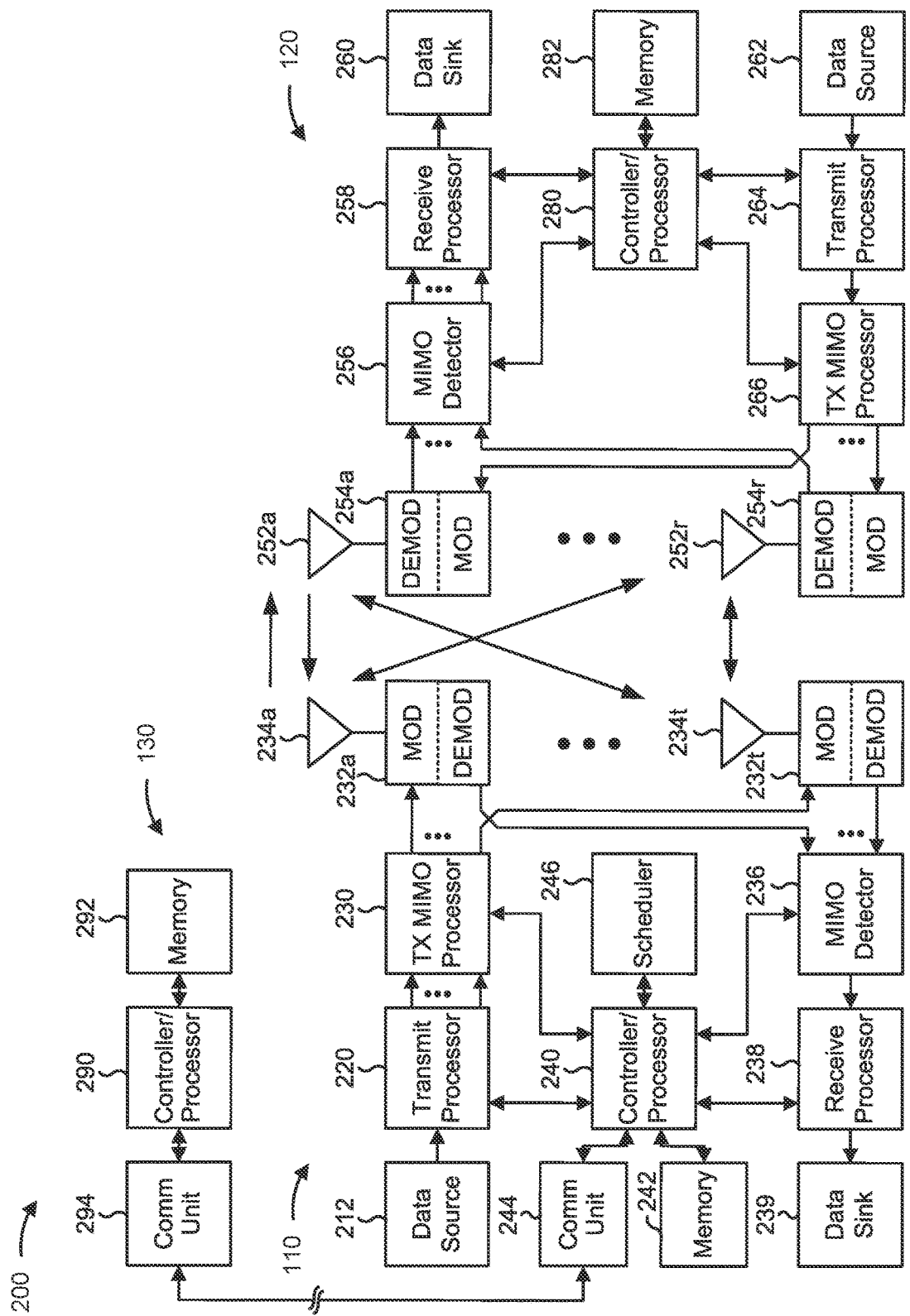
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision avoidance in a multi-subscriber identity module (MSIM) UE, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for detecting a radio access technology (RAT) of a first cell on which a first subscription of the UE is configured to camp is same as the RAT of a secondary cell group (SCG) on which a second subscription of the UE that is in a dual connectivity mode is configured to camp; and means for triggering, in response to the detecting, the first subscription or the second subscription to perform a mode operation of the second subscription or the first subscription, respectively. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
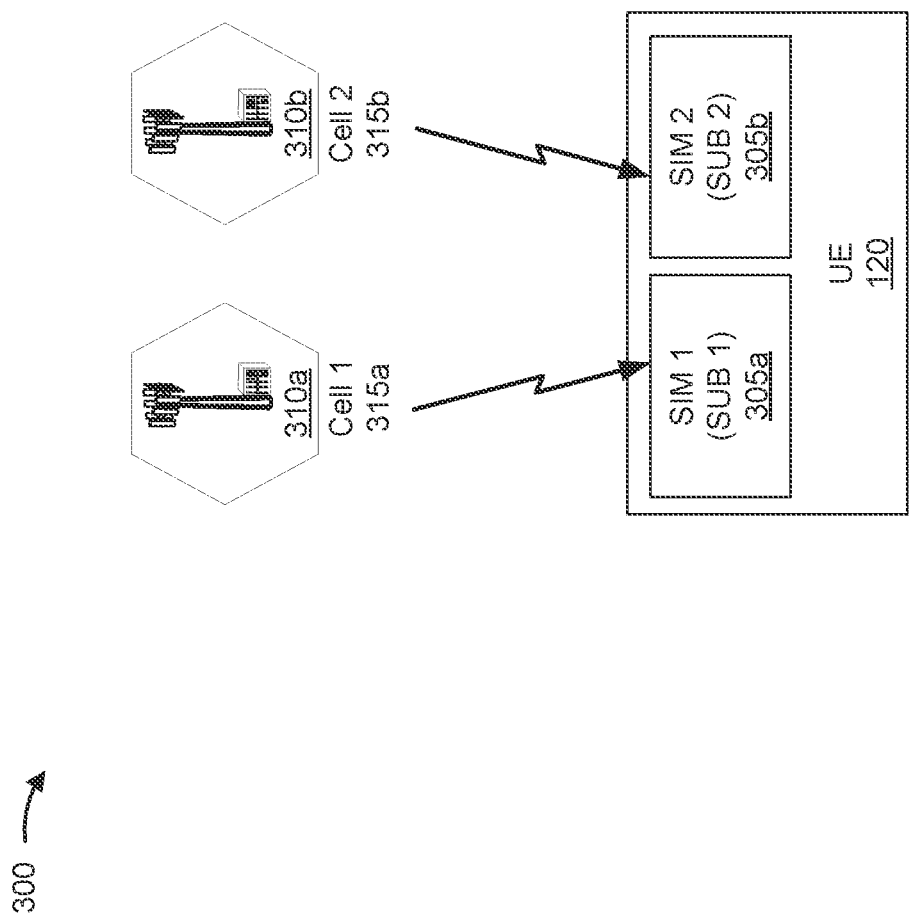
FIG. 3 is a diagram illustrating an example of operations of a multi-subscriber identity module user equipment, in accordance with various aspects of the present disclosure.

FIG. 3 is a diagram illustrating an example 300 of operations of a multi-subscriber identity module (multi-SIM) UE, in accordance with various aspects of the present disclosure. As shown in FIG. 3, a UE 120 may be a multi-SIM UE that includes multiple SIMs (e.g., two or more SIMs), shown as a first SIM 305a (shown as SIM 1) and a second SIM 305b (shown as SIM 2). The first SIM 305a may be associated with a first subscription (shown as SUB 1), and the second SIM 305b may be associated with a second subscription (shown as SUB 2). "Subscription" may refer to a subscription with a network operator (e.g., a mobile network operator (MNO)) that permits the UE 120 to access a wireless network (e.g., a radio access network (RAN)) associated with the network operator. A SIM 305 may be a removable SIM (e.g., a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, and/or the like.

As further shown in FIG. 3, the UE 120 may communicate (e.g., in a connected mode or an idle mode) with a first base station 310a via a first cell 315a (shown as Cell 1) using the first SIM 305a. In this case, a first subscription (SUB 1) of the UE 120 may be used to access the first cell 315a (e.g., using a first IMSI for UE identification, using a first security key for UE authentication, using a first list of services that the UE 120 is permitted to access using the first subscription, by counting data and/or voice usage on the first cell against the first subscription, and/or the like). Similarly, the UE 120 may communicate (e.g., in a connected mode or an idle mode) with a second base station 310b via a second cell 315b (shown as Cell 2) using the second SIM 305b. In this case, a second subscription (SUB 2) of the UE 120 may be used to access the second cell 315b (e.g., using a second IMSI for UE identification, using a second security key for UE authentication, using a second list of services that the UE 120 is permitted to access using the second subscription, by counting data and/or voice usage on the second cell against the second subscription, and/or the like). The first base station 310a and/or the second base station 310b may include one or more of the base stations 110 described above in connection with FIG. 1.

In some aspects, the UE 120 may be a dual SIM dual standby (DSDS) UE, where SIM 1 305a and SIM 2 305b may share a single transceiver. In such cases, SIM 1 305a and SIM 2 305b can both be used in idle mode (time multiplexing can be used to maintain both SIMs in idle mode). However, only one of the two SIMs can be used in an active mode; i.e., the radio connection to one of the SIMS may be disabled when the other SIM is connected in an active mode. For example, when one of SIM 1 305a and SIM 2 305b is in an active state, i.e., when the radio connection between the UE 120 and the network (e.g., LTE network, NR network, etc.) is active, the radio connection for the other SIM may become disabled because only one of SIM 1 305a and SIM 2 305b can be used in the active mode when the UE 120 is a DSDS UE.

In some aspects, one of the subscriptions of the MSIM UE 120 may be a dedicated data subscription (DDS) subscription that is configured for receiving data services from the network on which that subscription is camped while the other subscription may be a non-DDS (n-DDS) subscription. In some instances, the DDS subscription may be camped on a LTE network or NR network. Further, in some instances, the n-DDS subscription may be camped on a NR network. In some instances, the MSIM UE 120 may be a DSDS UE, and one of the subscriptions may be a DDS subscription in an active mode and the other subscription may be a n-DDS subscription in an idle mode. For example, with reference to FIG. 3, SUB 1 that is associated with SIM 1 305a may be a DDS subscription in an active mode camped on a LTE network or NR network and SUB 2 that is associated with SIM 2 305b may be a non-DDS subscription in an idle mode camped on a NR network.

In some aspects, the data services that are received by the DDS subscription (e.g., SUB 1) from the network (e.g., LTE network, NR network, etc.) on which the DDS subscription is camped may include evolved multimedia broadcast multicast services (eMBMS) data services. That is, the data services may be a point-to-multipoint data services which may include, for example, downlink data transmissions such as but not limited to live streaming data, mobile TV data, radio broadcasting data, emergency alert data, etc., from a LTE BS or a NR BS to multiple UEs (e.g., including the UE 120). For example, SUB 1 of the MSIM UE 120, which may be a DDS subscription, may be configured to receive eMBMS data from a LTE/NR BS. In such instances, SUB 1 (e.g., the DDS subscription) may access the eMBMS data at some durations in time domain of the radio connection (i.e., time durations of the radio resources of the connection) between SUB 1 of the MSIM UE 120 and the base station transmitting the eMBMS data. In some cases, the durations in the time domain via which the eMBMS data are transmitted may be fixed time slots of the radio resources/connection, which may save radio resources.

In some aspects, the durations in time domain of the radio resources/connection via which downlink data such as eMBMS data are received by the DDS subscription may collide with the paging occasion of the n-DDS subscription via which the n-DDS subscription receives paging messages. For example, the data slots via which eMBMS data services are received at the DDS subscription SUB 1 may collide with the page decoding occasion of the n-DDS subscription SUB 2, which may result in the loss of paging messages or pages at SUB 2 and/or subpar eMBMS data services at SUB 1 (and as such subpar user experiences) by the user of the UE 120. In some cases, once eMBMS data on SUB 1 collides with a page occasion in SUB 2, the collision may persist or continue for other/every paging occasions of SUB 2, resulting in paging message or page loss (e.g., and degraded user experience). In some instances, the term "collision" between downlink data (e.g., eMBMS data) and a paging occasion may be understood to refer to a partial or complete overlap between the time domain duration of a radio resource via which the eMBMS data is received at the DDS subscription SUB 1 and the paging occasion of the n-DDS subscription SUB 2 at the radio resource via which a paging message is received and decoded.

Figure 4:
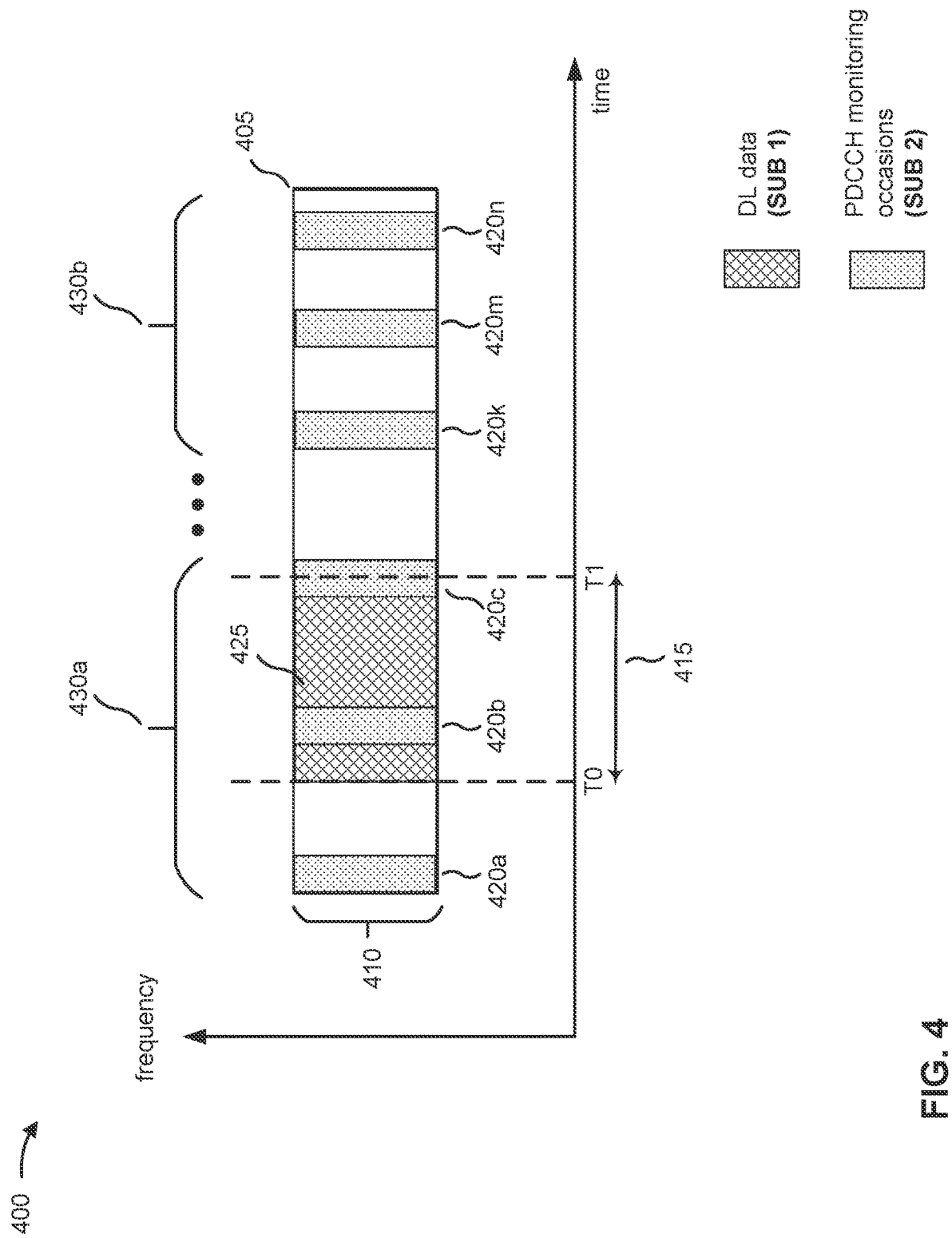
FIG. 4 is a diagram illustrating collision avoidance between time domain durations for receiving downlink data and paging occasions for receiving paging messages in a multi-subscriber identity module user equipment, in accordance with various aspects of the present disclosure.

Some aspects of the present disclosure disclose methods and systems for avoiding downlink data and paging occasion collisions in a multi-subscriber identity module (MSIM) user equipment (UE). FIG. 4 shows an example diagram illustrating a collision avoidance scheme 400 for avoiding collision between time domain durations for receiving downlink data and paging occasions for receiving paging messages in a multi-subscriber identity module user equipment, in accordance with various aspects of the present disclosure. In some instances, the scheme 400 may be employed by UEs such as the UEs 120 in a network such as the network 100, UE 120 in design 200, or UE 120 in example 300. In some instances, the MSIM UE may have a first subscription SUB 1 that is a DDS subscription configured to receive downlink (e.g., eMBMS) data 425 via a radio resource 405 (e.g., band width part (BWP)), which may comprise a frequency band 410 and time domain duration 415 between time T0 and time T1. Further, the MSIM UE may also have a second subscription SUB 2, which may be a n-DDS subscription, that is configured to receive paging messages via paging occasions 420a-420n in the frequency band 410. In FIG. 4, the x-axis represents time in some arbitrary units, and the y-axis represents frequency in some arbitrary units. In some instances, the frequency band 410 may be a subband of another larger frequency band that is partitioned into multiple subbands (e.g., one of which is frequency subband 410). For example, the frequency subband 410 may be one of four frequency subbands, each having bandwidth (BW) of about 20 MHz, that is partitioned from a frequency band that has a BW of about 80 MHz. In some cases, the frequency band or subband 410 (hereinafter referred as "subband") may be at any suitable frequencies (e.g., at about 2.4 GHz, 5 GHz, 6 GHz or higher) and may have any suitable bandwidth (e.g., about 80 MHz, 100 MHz, or higher). The frequency subband 410 may be shared by multiple network operating entities of same radio access technologies (RATs) or different RATs.

In some aspects, the first subscription of the UE (e.g., DDS subscription SUB 1) may establish a first connection with an LTE or NR BS (e.g., BS 110) and communicate with the BS over the established first connection. Similarly, the second subscription (e.g., n-DDS subscription SUB 2) may establish a second connection with a NR BS (e.g., BS 110) and communicate with the NR BS over the established second connection. In some aspects, as discussed above, if the MSIM UE is a DSDS UE with a DDS SUB 1 and a n-DDS SUB 2, and if SUB 1 is in an active mode, then the other subscription SUB 2 may be in an idle mode. As such, for example, DDS SUB 1 may establish a first connection and communicate in an active mode with a LTE or NR BS to receive eMBMS data 425 at the duration 415 in time domain of the radio resource 405. In such cases, the n-DDS SUB 2 may not be in active mode but rather may be in an idle mode, and may wake up during paging occasions to monitor for paging messages from the NR BS on which n-DDS SUB 2 is camped.

In some cases, the NR BS may configure SUB 2 with a DRX cycle or a paging cycle. Each DRX cycle may include one paging occasion. Further, the NR BS may configure SUB 2 with a set of PDCCH monitoring occasions for each paging occasion. If the NR BS receives data for the SUB 2 while SUB 2 is in an idle mode, the NR BS may send a paging message to the SUB 2 during a paging occasion of SUB 2. In some instances, if SUB 2 detects a paging message from the NR BS on which SUB 2 is camped, SUB 2 may decode the content of the paging message and initiate any applicable procedures for processing the content. To page SUB 2, the NR BS may send a PDCCH with a paging signature during a PDCCH monitoring occasion within a paging occasion. The paging signature may be a predetermined sequence and the PDCCH may be scrambled with the predetermined sequence. In context of NR, the paging signature may be referred to as a paging-radio network temporary identifier (P-RNTI). The paging PDCCH may indicate that the scheduling grant in the PDCCH is for paging.

In the scheme 400, the NR BS on which n-DDS SUB 2 is camped may configure n-DDS SUB 2 with one or more paging occasions 430 in the radio resource 405, where each paging occasion 430 may include a set of consecutive PDCCH monitoring occasions. For example, the paging occasion 430a may include the set of PDCCH monitoring occasions 420a, 420b, 420c, and the paging occasion 430b may include the set of PDCCH monitoring occasions 420k, 420m, 420n. It is to be noted that FIG. 4 is a non-limiting example illustration and that a radio resource 405 may be configured with any number of paging occasions that may include any number of PDCCH monitoring occasions.

In some aspects, each PDCCH monitoring occasion 420 may be associated with a synchronization signal block (SSB) (e.g., including PSS, SSS, PBCH signals) transmitted by the NR BS on which the n-DDS SUB 2 is camped. In some aspects, a paging occasion 430 may include S×X consecutive PDCCH monitoring occasions 420, where S represents the number of SSBs transmitted by the NR BS and X represents the number of PDCCH monitoring occasions associated with each SSB. In the context of NR, the NR BS may transmit a system information block Type 1 (SIB1) including a ssb-PositionInBurst parameter field indicating a value for the S parameter. The BS may also configure SUB 2 with a numPDCCHMonitoringOccasionPerSSB parameter field indicating a value for the X parameter. If the X parameter is not configured for SUB 2, the MSIM UE may set the parameter X to a value of 1.

In some instances, a paging occasion and the set of PDCCH monitoring occasions included therein may be associated with an SSB transmitted by the NR BS on which the n-DDS SUB 2 is camped. In some aspects, in a multibeam operation, the NR BS may transmit multiple beams (e.g., in multiple directions) each carrying an SSB and the SSBs may each be associated with a paging occasions and its related PDCCH monitoring occasions. For example, the paging occasion 430a and the PDCCH monitoring occasions 420a, 420b, 420c thereof may be associated with SSB of index 0, referred to as SSB 0, which may be transmitted by the NR BS to the n-DDS SUB 2 via a first beam, while the paging occasion 430b and the PDCCH monitoring occasions 420k, 420m, 420n thereof may be associated with SSB of index 1, referred to as SSB 1, which may be transmitted by the NR BS to the n-DDS SUB 2 via a second beam, etc.

In some aspects, the NR BS may determine to page the n-DDS SUB 2 while the n-DDS SUB 2 is in an idle mode, for example, upon detecting data for the n-DDS SUB 2 when the DDS SUB 1 is in an active mode with a LTE BS or NR BS. The NR BS on which the n-DDS SUB 2 is camped may page the n-DDS SUB 2 by sending a paging message to the n-DDS SUB 2 in a configured paging occasion (e.g., the paging occasion 430a). For example, the NR BS may send a PDCCH (e.g., with a P-RNTI) during the PDCCH monitoring occasions 420 of the paging occasion 430a to indicate a paging message transmission schedule. In some instances, the paging messages from the NR BS to the n-DDS SUB 2 may be transmitted via the multiple beams (e.g., and associated SSB). That is, in some cases, the paging message from the NR BS may be transmitted across all the SSBs from the NR BS. This may be because the NR network typically has information about the MSIM UE (i.e., SUB 2) at cell level and may not be aware about the SSB information.

In some instances, MSIM UEs generally select beams (and associated SSBs) for page/data decoding (e.g., by the subscriptions thereof) based on signal strength of the beams as measured using signal strength indicators such as but not limited to a reference signal received power (RSRP), a signal to interference plus noise ratio (SINR), a received signal strength indicator (RSSI), a reference signal received quality (RSRQ), a signal to noise plus interference ratio (SNIR), a signal to noise ratio (SNR), and/or the like. For example, the MSIM UE may select SSB associated with the paging occasion 430a and the PDCCH monitoring occasions 420a, 420b, 420c of the paging occasion 430a based on one or more of the afore-mentioned signal strength indicators for the decoding of paging messages by the n-DDS SUB 2 of the MSIM UE.

In some aspects, however, the pages or paging messages may be lost if downlink data 425 such as eMBMS data is received at the DDS SUB 1 of the MSIM UE at a duration 415 in time domain of a radio resource that at least overlaps with the paging occasion 430a via which the paging messages are configured to be received at the n-DDS SUB 2 of the MSIM UE. That is, the MSIM UE may detect a collision between the duration 415 in time domain (e.g., fixed time slots) of a radio resource that is configured to receive the downlink data 425 for the DDS SUB 1 of the MSIM UE and the paging occasion 430a that is configured to receive the paging messages for the n-DDS SUB 2 of the MSIM UE. In some instances, the collision may cause the loss of the pages or paging messages as well as the downlink data.

In some aspects, upon detecting that collisions between the duration 415 in time domain associated with DDS SUB 1 and the paging occasion associated with n-DDS SUB 2 may occur, the MSIM UE may monitor a paging occasion that is different from the paging occasion that is colliding with the duration in time domain associated with DDS SUB 1 (e.g., and configured to receive the downlink data). For example, the MSIM UE may monitor, for the pages or paging messages, a paging occasion 430b that is different from the paging occasion 430a which is colliding with the duration 415 in time domain that is configured to receive the downlink (e.g., eMBMS) data 425. In some instances, the MSIM UE can monitor other paging occasions, such as paging occasion 430b, for the paging messages because the paging messages are transmitted across all SSBs which are in turn associated, as discussed above, with the multiple paging occasions 430a, 430b and PDCCH monitoring occasions thereof. That is, as noted above, the paging occasion 430a (e.g., and the PDCCH monitoring occasions 420a, 420b, 420c thereof) may be associated with SSB 0 and the paging occasion 430b (e.g., and the PDCCH monitoring occasions 420k, 420m, 420n thereof) may be associated with SSB 1, and in such cases, because the paging messages are transmitted across all SSBs (e.g., including both SSB 0 and SSB 1), the MSIM UE may monitor the paging occasion 430b (e.g., and any of the associated PDCCH monitoring occasions) for the paging occasions when the duration 415 in time domain that is configured to receive the downlink (e.g., eMBMS) data 425 collides with paging occasions 430a.

In some aspects, the MSIM UE may switch the reception and/or decoding of the paging messages at the n-DDS SUB 2 from the paging occasion 430a to the paging occasion 430b based on the signal strength of the beams associated with the paging occasion 430b (e.g., and PDCCH monitoring occasions thereof) and via which the paging messages are transmitted. For example, the MSIM UE may switch to receiving and/or decoding paging messages at the n-DDS SUB 2 to the paging occasion 430b based on the signal strength indicators such as but not limited to RSRP, SINR, RSSI, RSRQ, SNIR, SNR, and/or the like, of the beam (e.g., associated with SSB 1) carrying the paging messages. For example, the switching may occur when one or more of the signal strength indicators is within respective threshold signal strength indicators. In some instances, the threshold signal strength indicators may represent at least adequate conditions for decoding the paging messages.

For example, if the RSRP of the beam carrying the paging message via paging occasion 430a is −80 dBm and the RSRP of the beam configured to carry a paging message via the paging occasion 430b (e.g., where of the downlink data 425 with the paging occasion 430b is avoided) is between −83 dBm to −85 dBm, and the RSRP threshold signal strength indicator is −100 dBm, then the switching to paging occasion 430b can occur because the −83 dBm to −85 dBm range is within the threshold −100 dBm. However, if the if the RSRP of the beam carrying the paging message via paging occasion 430a is <=−110 dBm and the RSRP of the beam configured to carry a paging message via the paging occasion 430b is <=−113 dBm (e.g., which is not within the RSRP threshold signal strength indicator), then the switch may not occur (e.g., the MSIM UE performance may be further degraded). In some instances, the paging occasion 430b to which the switch may occur may be selected such that the Srxlev>$S_{IntraSearchP}$ (e.g., where Srxlev is the cell selection RX level value in dB and $S_{intraSearchP}$ is the Srelev threshold in dB for intra-frequency measurements), and Squal>$S_{intraSearchQ}$ (e.g., where Squal is the cell selection quality value in dB and $S_{intraSearchQ}$ is the Squal threshold in dB for intra-frequency measurements), in which case the UE may not perform intra-frequency measurements. That is, the MSIM UE may follow the measurement rules for cell re-selection discussed in 3GPP technical specification (TS) 38.304 Release 16, which is incorporated herein by reference in its entirety.

In some aspects, the paging occasion 430b (e.g., and the PDCCH monitoring occasions thereof) that are configured to be monitored by the MSIM UE in response to the detection of the collision may be placed apart in the time domain to avoid the collision with the time domain duration 415. That is, the reception of the paging messages may be switched from the beam carrying SSB 0 transmitted via the paging occasion 430a to the beam carrying SSB 1 transmitted via the paging occasion 430b, and the paging occasion 430b may be positioned or spaced in the time domain apart from the duration 415 so as to avoid collision therewith. In some instances, SSB 1 that is associated with the paging occasion 430b may include a paging search space that is configured with a non-zero search space identity. In some instances, a periodicity of the paging search space may be a minimum time duration that allows the MSIM UE to overcome the collision. For example, the periodicity may be no less than about 5 ms, about 7 ms, about 10 ms, about 15 ms, about 20 ms, including values and subranges therebetween.

In some aspects, upon detecting the collision, the MSIM UE may avoid or overcome the collision by triggering the NR network on which the n-DDS SUB 2 of the MSIM UE is camped to initiate a mobility registration update of the MSIM UE, which may result in the paging occasion 430a that is colliding with the time domain duration 425 to be updated so that the MSIM UE is assigned a different paging occasion 430b that is not colliding with the time domain duration 425. That is, the mobility registration update of the MSIM UE may be configured to assign the MSIM UE an updated 5G global unique temporary identifier (5G-GUTI) or an updated 5G S-temporary mobile subscriber identity (5G-S-TMSI), which in turn may result in the reassignment of the paging occasion from the colliding paging occasion 430a to another paging occasion 430b that avoids collision with the time domain duration 425, as discussed below.

In some instances, in multi-beam operations, the length of one paging occasion is one period of beam sweeping and the MSIM UE can assume that the same paging message is repeated in all beams of the sweeping pattern and thus the selection of the beam(s) for the reception of the paging message is up to UE implementation. The paging message is same for both radio access network (RAN)-initiated paging and core network (CN)-initiated paging. The UE may initiate RRC Connection Resume procedure upon receiving RAN paging. If the UE receives a CN initiated paging in RRC_INACTIVE state, the UE moves to RRC_IDLE and informs non-access stratum (NAS).

The paging occasion may be determined using the index (i,s), which indicates the start of a set of PDCCH monitoring occasions for the paging DCI, and may be determined using the formula is =floor (UE_ID/N) mod Ns, where for default association Ns is either 1 or 2. Since is depends on UE_ID which is a function of 5G-S-TMSI (i.e., UE_ID=5G-S-TMSI mod 1024), which in turn is a function of 5G-GUTI, an update to 5G-GUTI may result in an update or change to the index (i,s), i.e., an update or change to the start of a set of PDCCH monitoring occasions, or the paging occasion including this set of PDCCH monitoring occasions.

5G-GUTI is updated, i.e., a MSIM UE is assigned a new 5G-GUTI when the MSIM UE undergoes a mobility registration update. Upon receiving registration request message of type "initial registration" or "mobility registration update" from a UE, the access and mobility management function (AMF) of the NR network sends a new 5G-GUTI to the UE in the registration procedure. In some instances, the generated 5G-GUTI may contain 5G-TMSI that uniquely identifies the UE within the AMF. A new I-RNTI may be sent to a UE only after a successful activation of access stratum (AS) security. As such, upon detecting a collision between paging occasion 430a and the time domain duration 425, the MSIM UE may avoid or overcome the collision by triggering the NR network on which the n-DDS SUB 2 of the MSIM UE is camped to initiate a mobility registration update of the MSIM UE, which results in a reassignment or update of 5G-GUTI, which in turn may result in the reassignment or update of 5G-S-TMSI, and ultimately the index (i,s), indicating an updated paging occasion 430*b* that is configured to avoid collision with the time domain duration 425.

Figure 5:
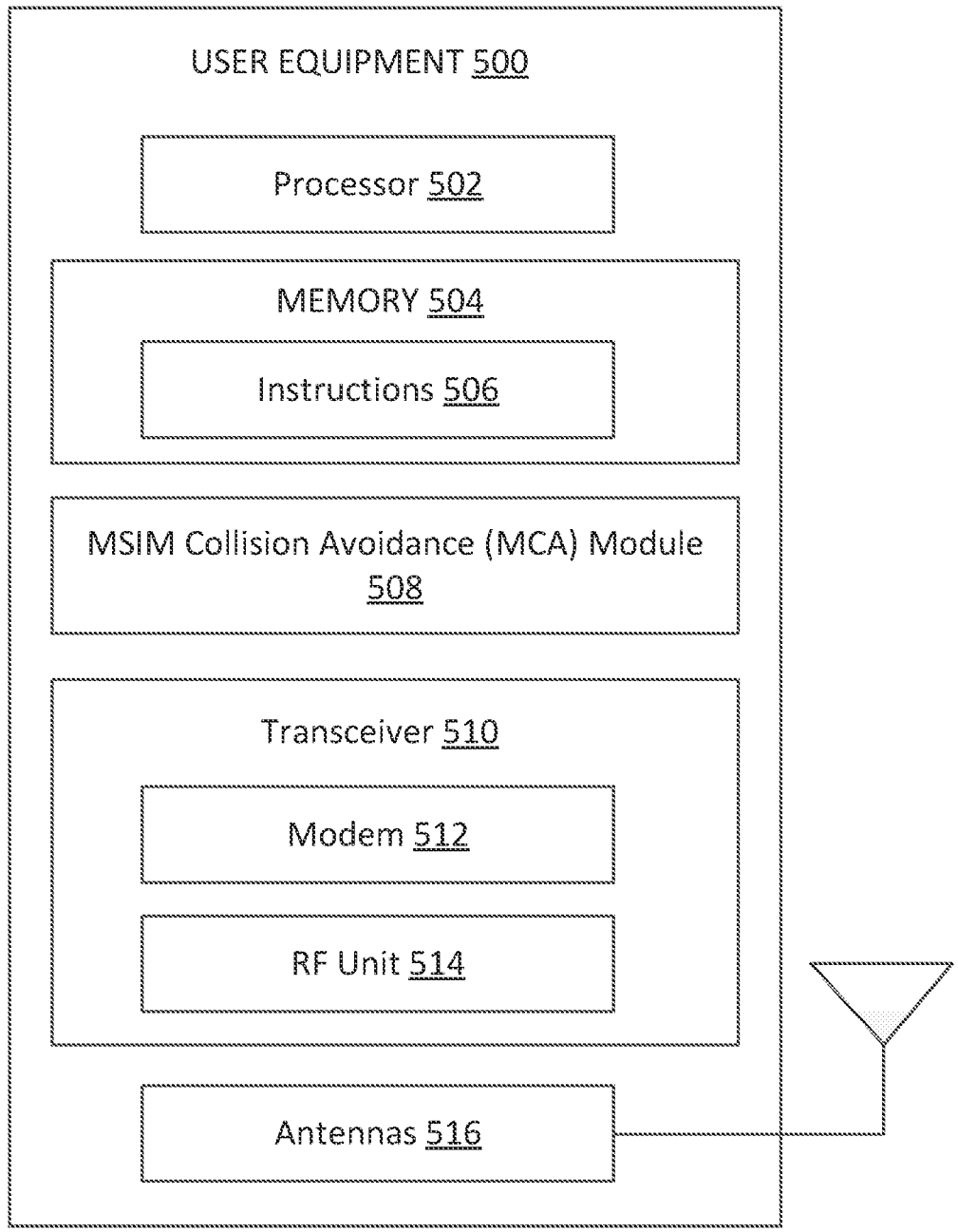
FIG. 5 is a block diagram of an exemplary user equipment according to some aspects of the present disclosure.

FIG. 5 is a block diagram of an exemplary UE 500 according to some aspects of the present disclosure. The UE 500 may be a UE 120 as discussed above with respect to FIGS. 1, 2, and 3. As shown, the UE 500 may include a processor 502, a memory 504, a MSIM Collision Avoidance (MCA) module 508, a transceiver 510 including a modem subsystem 512 and a radio frequency (RF) unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4, and 7. Instructions 506 may also be referred to as program code, which may be interpreted broadly to include any type of computer-readable statement(s). The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The MCA module 508 may be implemented via hardware, software, or combinations thereof. For example, the MCA module 508 may be implemented as a processor, circuit, and/or instructions 506 stored in the memory 504 and executed by the processor 502. In some examples, the MCA module 508 can be integrated within the modem subsystem 512. For example, the MCA module 508 can be implemented by a combination of software components (e.g., executed by a DSP or a general processor) and hardware components (e.g., logic gates and circuitry) within the modem subsystem 512.

The MCA module 508 may communicate with various components of the UE 500 to perform aspects of the present disclosure, for example, aspects of FIGS. 1-4, and 7. In some aspects, the MCA module 508 is configured to detect a collision between a duration in time domain configured to receive downlink data for a dedicated data subscription (DDS) subscription of the MSIM UE and a first paging occasion configured to receive a paging message for a non-DDS (n-DDS) subscription of the MSIM UE. Further, the MCA module 508 is configured to monitor a second paging occasion different from the first paging occasion for the paging message, the second paging occasion configured to avoid collision with the duration in time domain.

As shown, the transceiver 510 may include the modem subsystem 512 and the RF unit 514. The transceiver 510 can be configured to communicate bi-directionally with other devices, such as the BSs 110. The modem subsystem 512 may be configured to modulate and/or encode the data from the memory 504 and/or the MCA module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., control information (uplink and/or downlink), data (uplink and/or downlink), paging messages, etc.) from the modem subsystem 512 (on outbound transmissions) or of transmissions originating from another source such as a UE 120 or a BS 110. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 120 to enable the UE 120 to communicate with other devices.

The RF unit 514 may provide the modulated and/or processed data, e.g. data packets (or, more generally, data messages that may include one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., control information (uplink and/or downlink), data (uplink and/or downlink), paging messages, etc.) to the MCA module 508 for processing. The antennas 516 may include multiple antennas of similar or different designs in order to sustain multiple transmission links. The RF unit 514 may configure the antennas 516.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
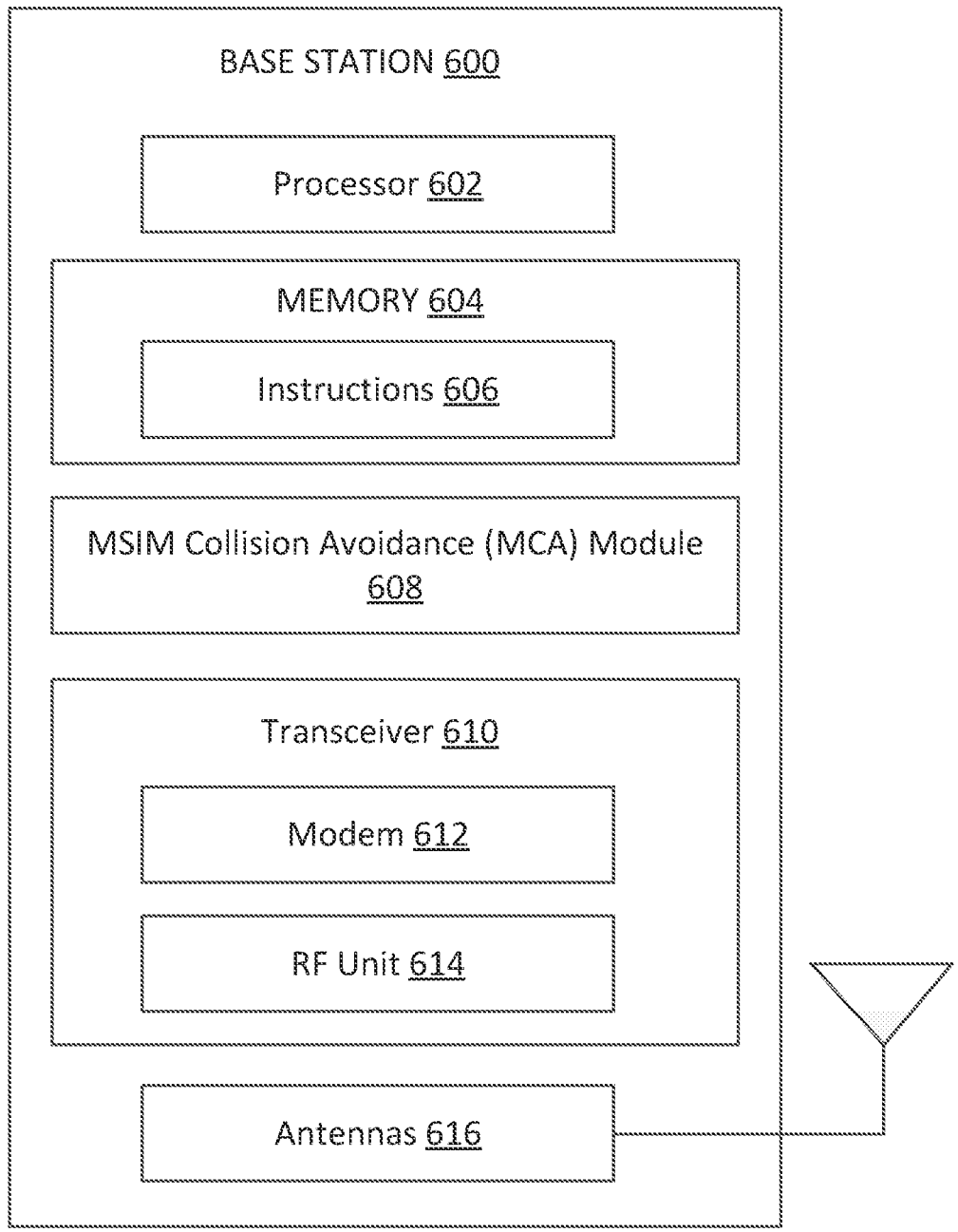
FIG. 6 is a block diagram of an exemplary base station according to some aspects of the present disclosure.

FIG. 6 is a block diagram of an exemplary BS 600 according to some aspects of the present disclosure. The BS 600 may be a BS 110 in the network 100 as discussed above in FIG. 1, or 2, or a BS 310 as discussed above in FIG. 3. A shown, the BS 600 may include a processor 602, a memory 604, a MCA module 608, a transceiver 610 including a modem subsystem 612 and a RF unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein, for example, aspects of aspects of FIGS. 1-4, and 7. Instructions 1006 may also be referred to as program code, which may be interpreted broadly to include any type of computer-readable statement(s).

The MCA module 608 may be implemented via hardware, software, or combinations thereof. For example, the MCA module 608 may be implemented as a processor, circuit, and/or instructions 606 stored in the memory 604 and executed by the processor 602. In some examples, the MCA module 608 can be integrated within the modem subsystem 612. For example, the MCA module 608 can be implemented by a combination of software components (e.g., executed by a DSP or a general processor) and hardware components (e.g., logic gates and circuitry) within the modem subsystem 612.

The MCA module 608 may communicate with various components of the BS 600 to perform various aspects of the present disclosure, for example, aspects of FIGS. 1-4, and 7. For example, the MCA module is configured to transmit downlink data and paging messages to the UE 500. Further, the MCA module may initiate a mobility registration update of a MSIM UE in response to detecting a collision between a time domain duration for downlink data associated with a first subscription of a MSIM UE and a paging occasion for receiving and decoding paging messages associated with a second subscription of the MSIM UE.

As shown, the transceiver 610 may include the modem subsystem 612 and the RF unit 614. The transceiver 610 can be configured to communicate bi-directionally with other devices, such as the UEs 120 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., RRC configuration, sidelink resource pools configurations) from the modem subsystem 612 (on outbound transmissions) or of transmissions originating from another source such as a UE 120. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 110 to enable the BS 110 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of downlink data and paging messages to a camped UE 120 according to some aspects of the present disclosure. The antennas 616 may further receive data messages transmitted from other devices and provide the received data messages for processing and/or demodulation at the transceiver 610. The transceiver 610 may provide the demodulated and decoded data to the MSS module 608 for processing. The antennas 616 may include multiple antennas of similar or different designs in order to sustain multiple transmission links.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
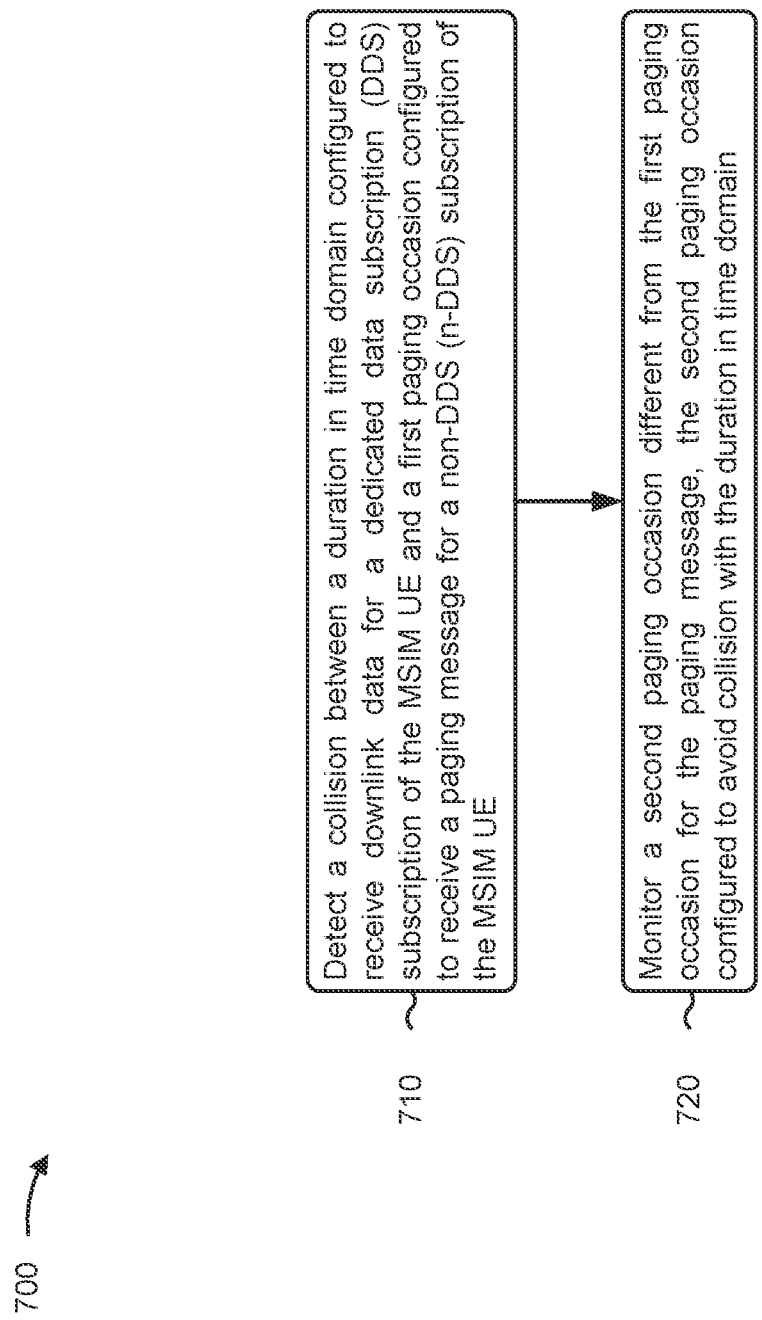
FIG. 7 is a diagram illustrating an example process performed by a user equipment, in accordance with various aspects of the present disclosure.

FIG. 7 is a flow diagram of a method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UEs 120, may utilize one or more components, such as the processor 502, the memory 504, the MCA module 508, the transceiver 510, the modem 512, and the one or more antennas 516, to execute the steps of method 700. The method 700 may employ similar mechanisms as described above in FIGS. 1-6. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, in some aspects, a UE (e.g., the UE 120) detects a collision between a duration in time domain configured to receive downlink data for a dedicated data subscription (DDS) subscription of the MSIM UE and a first paging occasion configured to receive a paging message for a non-DDS (n-DDS) subscription of the MSIM UE.

At block 720, in some aspects, the UE triggers, in response to the detecting, the first subscription or the second subscription to perform a mode operation of the second subscription or the first subscription, respectively.

In some aspects of method 700, the monitoring includes switching reception of the paging message from a first beam carrying a first synchronization signal block (SSB) transmitted via the first paging occasion to a second beam carrying a second SSB transmitted via the second paging occasion and spaced apart in time from the duration in time domain. Further, the switching occurs when a signal strength indicator of the second beam is within a respective threshold signal strength indicator. In some instances, the signal strength indicator is one or more of a reference signal received power (RSRP), a signal to interference plus noise ratio (SINR), a received signal strength indicator (RSSI), a reference signal received quality (RSRQ), a signal to noise plus interference ratio (SNIR), or a signal to noise ratio (SNR).

In some aspects of method 700, the second SSB includes a paging search space configured with a non-zero search space identity. In some instances, a periodicity of the paging search space is a minimum time duration that allows the MSIM UE to overcome the collision. For example, the periodicity may be no less than about 5 ms, about 7 ms, about 10 ms, about 15 ms, about 20 ms, including values and subranges therebetween.

Some aspects of method 700 comprises triggering, in response to the detecting the collision, a new radio (NR) network on which the n-DDS subscription is camped to initiate a mobility registration update of the UE. In some instances, the mobility registration update of the UE is configured to assign the UE an updated 5G global unique temporary identifier (5G-GUTI) or an updated 5G S-temporary mobile subscriber identity (5G-S-TMSI).

In some aspects of method 700, the DDS subscription is camped on a long-term evolution (LTE) network or a NR network, and the n-DDS subscription is camped on the NR network in an idle mode. In some aspects, the downlink data is evolved multimedia broadcast multicast services (eMBMS) data. In some cases, the DDS subscription is camped on a NR network and the eMBMS data is received via the NR network. In some aspects of method 700, the UE is a dual subscriber identity module (SIM) dual standby (DSDS) UE.

RECITATIONS OF VARIOUS ASPECTS OF THE PRESENT DISCLOSURE

Aspect 1: A method of wireless communication performed by a multi-subscriber identity module (MSIM) user equipment (UE), the method comprising: detecting a collision between a duration in time domain configured to receive downlink data for a dedicated data subscription (DDS) subscription of the MSIM UE and a first paging occasion configured to receive a paging message for a non-DDS (n-DDS) subscription of the MSIM UE; and monitoring a second paging occasion different from the first paging occasion for the paging message, the second paging occasion configured to avoid collision with the duration in time domain.

Aspect 2: The method of aspect 1, wherein the monitoring includes switching reception of the paging message from a first beam carrying a first synchronization signal block (SSB) transmitted via the first paging occasion to a second beam carrying a second SSB transmitted via the second paging occasion and spaced apart in time from the duration in time domain.

Aspect 3: The method of aspect 2, wherein the switching occurs when a signal strength indicator of the second beam is within a respective threshold signal strength indicator.

Aspect 4: The method of aspect 3, wherein the signal strength indicator is one or more of a reference signal received power (RSRP), a signal to interference plus noise ratio (SINR), a received signal strength indicator (RSSI), a reference signal received quality (RSRQ), a signal to noise plus interference ratio (SNIR), or a signal to noise ratio (SNR).

Aspect 5: The method of any of aspects 2-4, wherein the second SSB includes a paging search space configured with a non-zero search space identity.

Aspect 6: The method of aspect 5, wherein a periodicity of the paging search space is no less than a minimum time duration to overcome the collision.

Aspect 7: The method of any of aspects 1-6, further comprising triggering, in response to the detecting the collision, a new radio (NR) network on which the n-DDS subscription is camped to initiate a mobility registration update of the UE.

Aspect 8: The method of aspect 7, wherein the mobility registration update of the UE is configured to assign the UE an updated 5G global unique temporary identifier (5G-GUTI) or an updated 5G S-temporary mobile subscriber identity (5G-S-TMSI).

Aspect 9: The method of any of aspects 1-8, wherein the DDS subscription is camped on a long-term evolution (LTE) network or a NR network, and the n-DDS subscription is camped on the NR network in an idle mode.

Aspect 10: The method of any of aspects 1-9, wherein the downlink data is evolved multimedia broadcast multicast services (eMBMS) data.

Aspect 11: The method of aspect 10, wherein the DDS subscription is camped on a NR network and the eMBMS data is received via the NR network.

Aspect 12: The method of any of aspects 1-11, wherein the UE is a dual subscriber identity module (SIM) dual standby (DSDS) UE.

Aspect 13: A user equipment (UE), comprising: a memory; and a processor coupled to the memory, the UE configured to perform the methods of aspects 1-12.

Aspect 14: A non-transitory computer-readable medium (CRM) having program code recorded thereon, the program code comprises code for causing a UE to perform the methods of aspects 1-12.

Aspect 15: A user equipment (UE) comprising means for performing the methods of aspects 1-12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a multi-subscriber identity module (MSIM) user equipment (UE), the method comprising:
    detecting a collision between a duration in time domain configured to receive downlink data for a dedicated data subscription (DDS) subscription of the MSIM UE and a first paging occasion configured to receive a paging message for a non-DDS (n-DDS) subscription of the MSIM UE;
    monitoring a second paging occasion different from the first paging occasion for the paging message, the second paging occasion configured to avoid collision with the duration in time domain; and
    triggering, in response to the detecting the collision, a new radio (NR) network on which the n-DDS subscription is camped to initiate a mobility registration update of the UE.

2. The method of claim 1, wherein the monitoring includes switching reception of the paging message from a first beam carrying a first synchronization signal block (SSB) transmitted via the first paging occasion to a second beam carrying a second SSB transmitted via the second paging occasion and spaced apart in time from the duration in time domain.

3. The method of claim 2, wherein the switching occurs when a signal strength indicator of the second beam is within a respective threshold signal strength indicator.

4. The method of claim 3, wherein the signal strength indicator is one or more of a reference signal received power (RSRP), a signal to interference plus noise ratio (SINR), a received signal strength indicator (RSSI), a reference signal received quality (RSRQ), a signal to noise plus interference ratio (SNIR), or a signal to noise ratio (SNR).

5. The method of claim 2, wherein the second SSB includes a paging search space configured with a non-zero search space identity.

6. The method of claim 5, wherein a periodicity of the paging search space is no less than a minimum time duration to overcome the collision.

7. The method of claim 1, wherein the mobility registration update of the UE is configured to assign the UE an updated 5G global unique temporary identifier (5G-GUTI) or an updated 5G S-temporary mobile subscriber identity (5G-S-TMSI).

8. The method of claim 1, wherein the DDS subscription is camped on a long-term evolution (LTE) network or a NR network, and the n-DDS subscription is camped on the NR network in an idle mode.

9. The method of claim 1, wherein the downlink data is evolved multimedia broadcast multicast services (eMBMS) data.

10. The method of claim 9, wherein the DDS subscription is camped on a NR network and the eMBMS data is received via the NR network.

11. The method of claim 1, wherein the UE is a dual subscriber identity module (SIM) dual standby (DSDS) UE.

12. A multi-subscriber identity module (MSIM) user equipment (UE), comprising:
    a memory; and
    a processor operatively coupled to the memory and configured to:
        detect a collision between a duration in time domain configured to receive downlink data for a dedicated data subscription (DDS) subscription of the MSIM UE and a first paging occasion configured to receive a paging message for a non-DDS (n-DDS) subscription of the MSIM UE;
        monitor a second paging occasion different from the first paging occasion for the paging message, the second paging occasion configured to avoid collision with the duration in time domain; and
        trigger, in response to the detecting the collision, a new radio (NR) network on which the n-DDS subscription is camped to initiate a mobility registration update of the MSIM UE.

13. The MSIM UE of claim 12, wherein the processor is configured to switch reception of the paging message from a first beam carrying a first synchronization signal block (SSB) transmitted via the first paging occasion to a second beam carrying a second SSB transmitted via the second paging occasion and spaced apart in time from the duration in time domain.

14. The MSIM UE of claim 13, wherein the processor is configured to switch when a signal strength indicator of the second beam is within a respective threshold signal strength indicator.

15. The MSIM UE of claim 14, wherein the signal strength indicator is one or more of a reference signal received power (RSRP), a signal to interference plus noise ratio (SINR), a received signal strength indicator (RSSI), a reference signal received quality (RSRQ), a signal to noise plus interference ratio (SNIR), or a signal to noise ratio (SNR).

16. The MSIM UE of claim 13, wherein the second SSB includes a paging search space configured with a non-zero search space identity.

17. The MSIM UE of claim 12, wherein the mobility registration update of the MSIM UE is configured to assign the MSIM UE an updated 5G global unique temporary identifier (5G-GUTI) or an updated 5G S-temporary mobile subscriber identity (5G-S-TMSI).

18. The MSIM UE of claim 12, wherein the DDS subscription is camped on a long-term evolution (LTE) network or a NR network, and the n-DDS subscription is camped on the NR network in an idle mode.

19. The MSIM UE of claim 12, wherein the DDS subscription is camped on a NR network and the downlink data is evolved multimedia broadcast multicast services (eMBMS) data configured to be received via the NR network.

20. The MSIM UE of claim 12, wherein the MSIM UE is a dual subscriber identity module (SIM) dual standby (DSDS) UE.

21. A non-transitory computer-readable medium (CRM) having program code recorded thereon, the program code comprising:
    code for causing a multi-subscriber identity module (MSIM) user equipment (UE) to detect a collision between a duration in time domain configured to receive downlink data for a dedicated data subscription (DDS) subscription of the MSIM UE and a first paging occasion configured to receive a paging message for a non-DDS (n-DDS) subscription of the MSIM UE;
    code for causing the MSIM UE to monitor a second paging occasion different from the first paging occasion for the paging message, the second paging occasion configured to avoid collision with the duration in time domain; and
    code for causing the MSIM UE to trigger, in response to the detecting the collision, a new radio (NR) network on which the n-DDS subscription is camped to initiate a mobility registration update of the MSIM UE.

22. The non-transitory CRM of claim 21, further comprising code for switching reception of the paging message from a first beam carrying a first synchronization signal block (SSB) transmitted via the first paging occasion to a second beam carrying a second SSB transmitted via the second paging occasion and spaced apart in time from the duration in time domain.

23. The non-transitory CRM of claim 21, wherein the mobility registration update of the MSIM UE is configured to assign the MSIM UE an updated 5G global unique temporary identifier (5G-GUTI) or an updated 5G S-temporary mobile subscriber identity (5G-S-TMSI).

24. The non-transitory CRM of claim 21, wherein the DDS subscription is camped on a NR network and the downlink data is evolved multimedia broadcast multicast services (eMBMS) data configured to be received via the NR network.

25. A multi-subscriber identity module (MSIM) user equipment (UE), comprising:
    means for detecting a collision between a duration in time domain configured to receive downlink data for a dedicated data subscription (DDS) subscription of the MSIM UE and a first paging occasion configured to receive a paging message for a non-DDS (n-DDS) subscription of the MSIM UE;
    means for monitoring a second paging occasion different from the first paging occasion for the paging message, the second paging occasion configured to avoid collision with the duration in time domain; and
    means for triggering, in response to the detecting the collision, a new radio (NR) network on which the n-DDS subscription is camped to initiate a mobility registration update of the UE.

26. The MSIM UE of claim 25, further comprising means for switching reception of the paging message from a first beam carrying a first synchronization signal block (SSB) transmitted via the first paging occasion to a second beam carrying a second SSB transmitted via the second paging occasion and spaced apart in time from the duration in time domain.

27. The MSIM UE of claim 25, wherein the mobility registration update of the MSIM UE is configured to assign the UE an updated 5G global unique temporary identifier (5G-GUTI) or an updated 5G S-temporary mobile subscriber identity (5G-S-TMSI).

28. The UE of claim 25, wherein the MSIM UE is a dual subscriber identity module (SIM) dual standby (DSDS) UE.

* * * * *